Nov. 14, 1967  R. J. IVERS  3,352,608
DITHERING SUSPENSION SYSTEM
Filed April 16, 1965
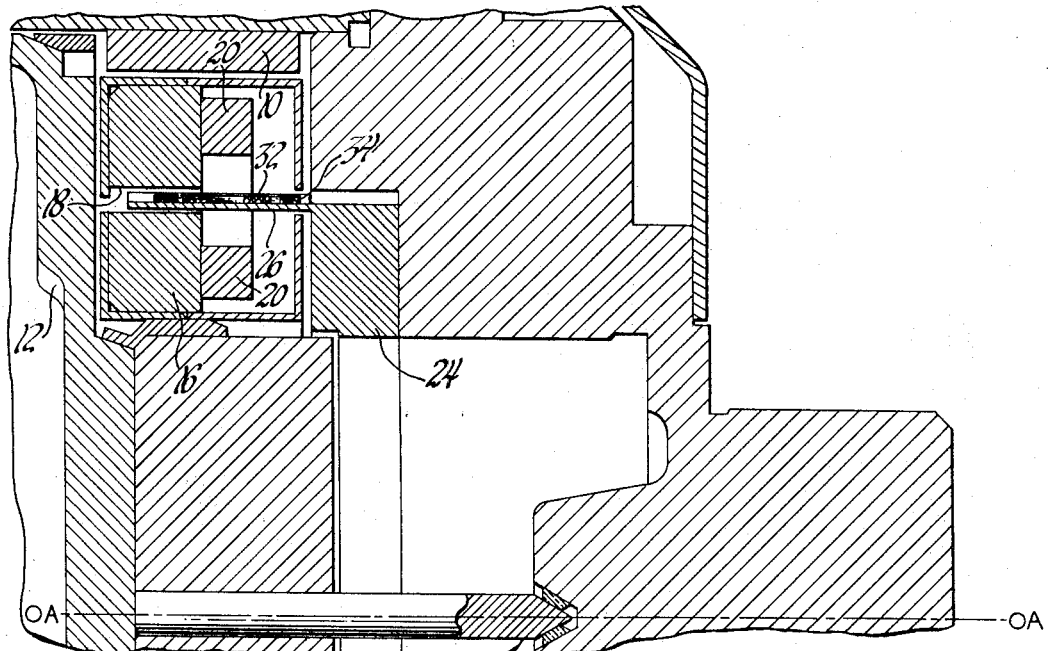
Fig. 1
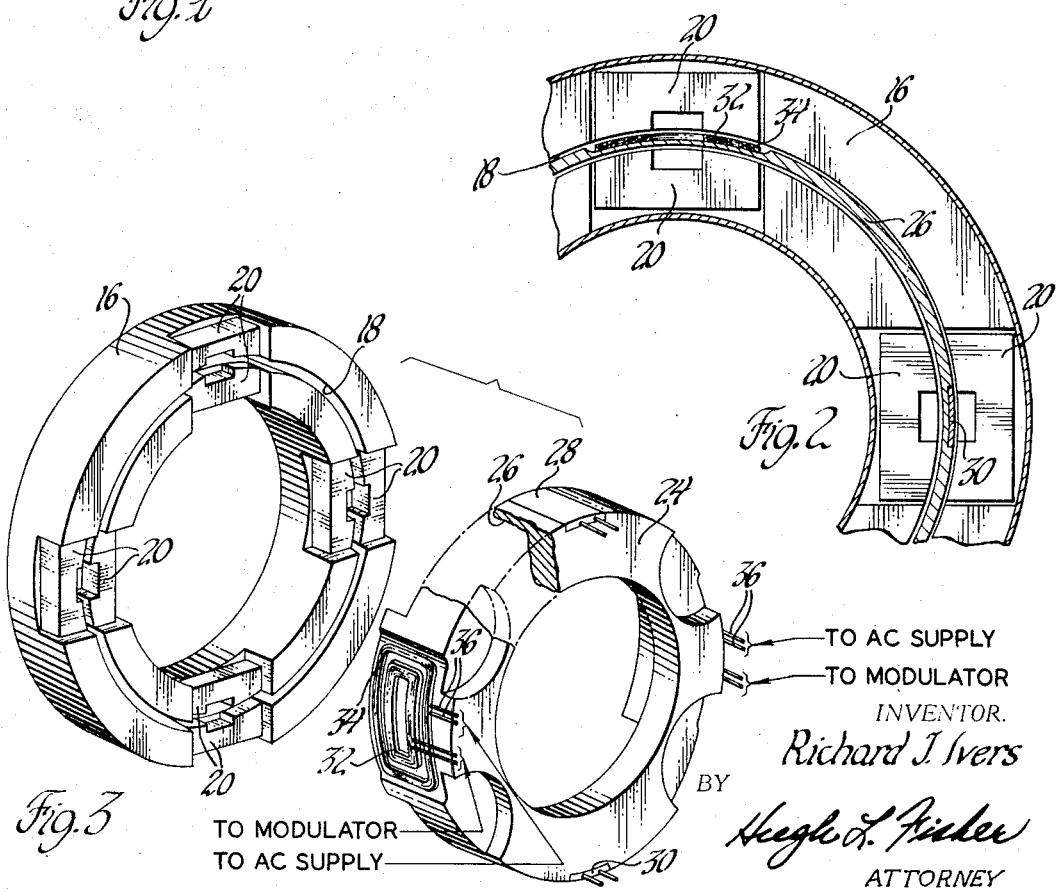
Fig. 2
Fig. 3
TO MODULATOR
TO AC SUPPLY
TO AC SUPPLY
TO MODULATOR
INVENTOR.
Richard J. Ivers
BY
Hugh L. Fisher
ATTORNEY United States Patent Office 3,352,608
Patented Nov. 14, 1967

3,352,608
DITHERING SUSPENSION SYSTEM
Richard J. Ivers, Arlington, Mass., assignor to General Motors Corporation, Detroit, Mich., a corporation of Delaware
Filed Apr. 16, 1965, Ser. No. 448,723
4 Claims. (Cl. 308—10)

ABSTRACT OF THE DISCLOSURE

Dithering apparatus for a single axis gyro rotor bearing. Two coils are mounted on the stator within radial fields of rotor-mounted magnets to produce a radial force on the rotor when energized with AC current.

*Summary of the invention*

This invention relates to dithering apparatus for relieving the effects of friction in precision bearings.

There are many instances where it is desirable to relieve or eliminate the effects of friction in bearings. An example of such an instance is in a gyroscopic instrument having a rotor assembly supported by bearings for rotation about an axis with respect to a frame of reference. To accurately and precisely measure the angular displacement of the rotor assembly with respect to the frame of reference, the error torque produced by bearing friction must be minimized. Displacement signal generator for use in such precision applications thus to make desirable the addition of the present invention are shown in United States Patent No. 3,188,540, entitled "Signal Pick-off and D. C. Torquer," filed Aug. 26, 1964, in the name of Argyle G. Lautzenhiser, and United States Ser. No. 401,006, entitled "Signal Pick-Off and Torque Generator," filed Oct. 2, 1964, in the names of Harold E. Clark and Robert F. Wolf.

In accordance with the present invention, the effect of friction in bearing means associated with a rotor which is supported by the bearing means for rotation about a predetermined axis is minimized or eliminated through the provision of means for applying a periodically reversing radial force to the rotor member, thus tending to radially shift the rotor with respect to a frame of reference.

In a preferred form of the invention, two relatively rotatable bodies are provided having bearing means of a mechanical nature for providing the relative rotation about a predetermined axis. One of the members carries at spaced points about the axis a plurality of permanent magnets for producing magnetic fields at the spaced point. The other member carries a plurality of conductive coils also disposed at spaced points about the axis, which points correspond to the locations of the permanent magnets, thus to place portions of the coils within the magnetic fields. The coils are energized with an alternating current thereby producing in accordance with classical dynamo-electric theory periodically reversing tangential forces between the two members, which forces are of an opposing nature to prevent the inadvertent production of a torque tending to rotate the two bodies relative to one another about the axis. The tangential forces, while opposing in an angular sense, are additive in a radial sense to produce a radially acting resultant force vector which tends to radially shift one of the members with respect to the other.

The invention as well as the application thereof may be best understood by a reading of the following specification which describes a specific embodiment thereof. This specification is to be taken with the accompanying drawing of which:

FIGURE 1 is a cross-sectional view of a portion of a single degree of freedom gyro having a float assembly which is rotatable about an output axis and employing a specific embodiment of the invention which operates in connection with a displacement signal generator to relieve the effect of friction in the float assembly bearing;

FIGURE 2 is a sectional view of a portion of the pickoff torquer assembly shown in FIGURE 1 indicating the nature and relative positions of the magnet means and the conductive coils; and FIGURE 3 is an exploded view of a rotor and stator assembly of a displacement signal generator employing the present invention.

Referring now to FIGURE 1, there is shown a portion of the gyroscopic instrument including a housing 10 and a float assembly 12 suspended within the housing 10 by means of a mechanical bearing or pivot generally indicated at 14. The instrument shown in FIGURE 1 is of the single degree of freedom type in which the float assembly 12 is rotatable about a horizontal axis OA extending longitudinally through the center line of the bearing 14. It is necessary in such a gyroscopic instrument to detect the angular displacement of the float assembly 12 about the axis OA, as caused by precession of a gyro rotor carried by the float assembly 12.

The displacement signal generator means shown in FIGURES 1-3 is of the type disclosed in United States Ser. No. 401,006, entitled "Signal Pick-Off and Torque Generator," filed Oct. 2, 1964. This displacement signal generator includes a rotor member 16 which is secured to the float assembly 12 and is rotatable therewith about the axis OA. The rotor member 16 is of a generally annular shape and is made of a nonmagnetic material such as beryllium. Formed in the rotor 16 is an axially extending annular slot 18 which is coaxial with the rotor member 16 and the float assembly 12. As best shown in FIGURE 3, the rotor member 16 carries four pairs of generally U-shaped permanent magnets 20 which are located approximately at 90° intervals about the rotor member 16. As indicated, the magnets 20 of each pair of magnets are disposed in mutually facing relation on opposite sides of the slot 18. In addition, magnets 20 are arranged with opposite poles in juxtaposition such that a flux path through each pair of magnets 20 crosses the air gap defined by the slot 18 in two directions, thus to provide a bipolar magnetic field across the slot 18 at each of the four locations of the magnets 20 about the annular slot 18.

The displacement signal generator further includes a generally annular stator member 24 which is also constructed of a nonmagnetic material such as beryllium. The stator member 24, which is also symmetrically disposed about the axis OA, includes an axially extending sleeve portion 26 which, when the apparatus is assembled as shown in FIGURE 1, extends axially into the slot 18 in the rotor member 16 and is spaced from the walls of the slot 18 to allow for relative rotation between the rotor and stator members.

Disposed at diametrically opposite positions, as best shown in FIGURE 3, on the stator member 24 is a pair of Hall effect devices 28 and 30. The Hall effect devices are recessed slightly into the surface of the sleeve portion 26 to be flush with the surface. In the present device, the Hall effect devices 28 and 30 are employed for detecting relative displacement between the rotor member 16 and the stator member 24. This is accomplished by defining a reference position for the rotor member 16 relative to the stator member 24 in which position the Hall effect devices 28 and 30 are between the opposite legs of respective pairs of the permanent magnets 20 on opposite sides of the slot 18 as best shown in FIGURE 2. Displacement of the rotor member 16 relative to the stator member results in a movement of the Hall effect devices into one of the two air gaps between the poles of permanent magnets 20. This relative rotation produces a change in the incident magnetic field and may be employed through suitable modulator means to provide a displacement signal as well as an error signal which may be applied to torquing means for torquing the rotor member 16 back to the reference position.

This torquing means is shown in the figures to include a pair of torquing coils 32 of which only one is variable in each of FIGURES 1 and 3. These torquing coils 32 also are disposed on the periphery of the stator member 24 at approximately diametrically opposite positions and may be energized with a current tending to produce additive tangential forces in cooperation with the magnetic fields produced by permanent magnets 20. These additive tangential forces are acting in the same angular direction thus to provide a torque on the rotor 16 tending to angularly displace it with respect to the stator member 24.

It can be seen that friction in bearing 14 could prevent detection of small torques tending to rotate float 12 relative to housing 10. To minimize friction, there is also disposed on the periphery of the sleeve portion 26 of stator member 24 a pair of dithering coils 34 each having a pair of terminals 36 which are connected to an AC supply source, as indicated in FIGURE 3. As shown in FIGURE 2, the dithering coils are disposed on the stator member 24 outside of the torquing coils 32 such that the axially extending leg portions thereof lie within the air gap between the poles of the permanent magnets 20. It can thus be seen that when energized with an alternating current, since this current runs transverse to the direction of the magnetic field, a tangential torque is produced. Each of the dithering coils 34 is energized by the AC supply in the same phase such that the tangential torques produced thereby are opposing, that is, acting in opposite angular directions. Since these torques are opposing, no moment is produced tending to rotate rotor member 16 relative to stator member 24. However, the resultant force vector of the forces produced by the dithering coils 34 is such as to tend to radially shift the rotor member 16 relative to the stator member 24. This radial shift is of a periodically reversing nature inasmuch as the force is produced by a periodically reversing AC supply current. This periodically reversing force is applied radially to the bearing 14 thus to provide a form of dithering action which tends to relieve the effects of friction in the mechanical bearing 14. The relief of this friction allows the signal generator and torquer to operate with greatly increased precision, thus increasing the accuracy and adaptability of the gyro instrument in general.

While the invention has been described with reference to a specific embodiment thereof, various modifications and additions to this embodiment will occur to those skilled in the art, and accordingly the above description is not to be construed in a limiting sense. For a definition of the invention reference should be had to the appended claims.

I claim:

1. Dithering apparatus comprising first and second members, bearing means for permitting relative rotation of the first and second members about an axis, means carried by one of the members for producing magnetic fields at spaced points on said one member, conductor means carried by the other of the members at corresponding points thereon, and means for producing an in-phase alternating current in the conductor means thereby to produce a periodically reversing radial force with respect to the axis tending to displace said one member relative to the other.

2. Dithering means for bearings comprising a rotor and a stator, bearing means for permitting relative rotation therebetween about an axis, a plurality of permanent magnet means carried by the rotor for producing magnetic fields at spaced points about the rotor, a plurality of conductive coils carried by the stator at spaced points corresponding with the magnet means to be disposed within the magnetic fields, and means for producing in-phase alternating currents in the coils thereby to produce periodically reversing tangential forces tending to displace the rotor radially with respect to said axis.

3. In combination with a signal pickup and torque generator for a rotatable member comprising a first body including means for establishing a plurality of permanent magnetic poles circumferentially about an axis of the first body, a second body coaxially disposed with respect to the first body, bearing means for permitting relative rotation between the first and second bodies about the common axis thereof in accordance with rotation of said member, a pair of Hall effect devices mounted on the second body for producing output signals related to the magnitude of a magnetic field incident thereon, the Hall effect devices being disposed adjacent the magnetic poles when the first body occupies a reference position with respect to the second body such that relative rotation of the bodies complementally varies the field incident upon the devices, a torquing coil carried by the second body adjacent one of the magnetic poles of the first body: dithering means comprising a pair of dithering coils carried by the second body adjacent respective magnetic poles of the first body, and means to energize the dithering coils with an alternating current thus to produce opposing tangential forces on the second body tending to produce a relative radial shift between the first and second bodies.

4. A signal pickoff and torque generator for a rotatable member comprising a first body having an axially extending annular slot formed therein, a plurality of permanent magnet means disposed on the first body for producing respective magnetic fields across the slot at discrete points, a second body coaxially disposed with respect to the first body and having an annular sleeve portion extending axially into the slot but spaced from the first body, bearing means for permitting relative rotation between the first and second bodies about the common axis thereof in accordance with rotation of the member, at least one Hall effect device mounted on the sleeve portion of the second body for producing output signals related to the character of a magnetic field incident thereon, the Hall effect device being disposed adjacent one of the magnet means when the first body is in a reference position relative to the second body and being responsive to relative rotation between the bodies to produce corresponding output signals, a torquing coil mounted on the sleeve portion of the second body adjacent another of the magnet means so as to be within the field produced thereby when the bodies are in the reference position: dithering means comprising a pair of dithering coils carried by the second body adjacent respective magnetic poles of the first body, and means to energize the dithering coils with an alternating current thus to produce opposing tangential forces on the second body tending to produce a relative radial shift between the first and second bodies.

References Cited
UNITED STATES PATENTS 3,154,707  10/1964  Bright _____ 310—261

MILTON O. HIRSHFIELD, Primary Examiner.

L. L. SMITH, Assistant Examiner.